United States Patent [19]
Narimoto et al.

[11] Patent Number: 5,886,439
[45] Date of Patent: Mar. 23, 1999

[54] MOTOR UNIT HAVING DRIVE MOTOR AND CONTROLLER

[75] Inventors: Eiki Narimoto; Mitsuho Nakagawa, both of Nagoya, Japan

[73] Assignee: Brother Kogyo Kabushiki Kaisha, Nagoya, Japan

[21] Appl. No.: 751,940

[22] Filed: Nov. 19, 1996

[30] Foreign Application Priority Data

Dec. 7, 1995 [JP] Japan .................................... 7-319083

[51] Int. Cl.$^6$ ........................... H02K 11/00; H02K 5/00; D05B 69/18; D05B 69/12
[52] U.S. Cl. ........................... 310/91; 310/89; 310/68 R; 112/258; 112/259; 112/260; 318/17
[58] Field of Search ............................. 310/89, 91, 68 R, 310/64, 67 R, 71; 112/220, 275, 277, 258, 259, 260

[56] References Cited

U.S. PATENT DOCUMENTS

| | | | |
|---|---|---|---|
| Re. 26,836 | 3/1970 | Myers | 112/259 |
| 3,783,809 | 1/1974 | Marforio | 112/258 |
| 3,789,783 | 2/1974 | Cook et al. | 112/220 |
| 4,033,531 | 7/1977 | Levine | 248/16 |
| 4,691,651 | 9/1987 | Junemann | 112/259 |
| 4,988,905 | 1/1991 | Tolmie, Jr. | 310/68 B |
| 5,245,237 | 9/1993 | Fisher et al. | 310/89 |
| 5,271,346 | 12/1993 | Mori | 112/220 |
| 5,315,194 | 5/1994 | Brusasco et al. | 319/68 R |
| 5,341,074 | 8/1994 | Zorzolo | 318/17 |
| 5,532,534 | 7/1996 | Baker et al. | 310/89 |

Primary Examiner—Nestor Ramirez
Assistant Examiner—Tran N. Nguyen
Attorney, Agent, or Firm—Oliff & Berridge, PLC

[57] ABSTRACT

A motor unit having a drive motor, a control portion, and a base made of an aluminum die-casting product. The motor unit is fixed to a fixing stand of a sewing machine for driving a drive shaft thereof. The base has a pair of supporting brackets connected to the fixing stand for suspendingly fixing the base to the fixing stand. The base has a plate-like portion. The drive motor is fixed to one surface of the plate-like portion, and the control portion is fixed to an opposite surface thereof. A motor cover made of a synthetic resin is mounted on the one surface for covering the drive motor, and a protection cover made of a synthetic resin is mounted on the opposite surface for covering the control portion. The control portion includes a plurality of electronic components including heat generating elements. The heat generating elements are directly mounted on the base to release heat from the base.

24 Claims, 3 Drawing Sheets

MOTOR UNIT HAVING DRIVE MOTOR AND CONTROLLER

BACKGROUND OF THE INVENTION

The present invention relates to a motor unit having a drive motor and a control portion for controlling the drive motor, and more particularly, to a type thereof particularly useful as a drive source for an industrial sewing machine.

In a conventional industrial sewing machine, an induction motor used as a drive motor is provided separately from a control portion which controls the drive motor. The drive motor and the control portion are respectively attached to a fixing portion of the sewing machine.

Further, in an industrial machine such as the sewing machine to which an operator is directly accessible for its operation, housings are attached to the fixing portion for housing respectively the drive motor, the control portion as well as a power transmitting system so as to avoid danger to the operator. These housings are made to have a mechanically high rigidity such as a product of a aluminum die-casting product, otherwise the housing may be released from the fixing portion if the housing is made from a mere metal plate.

Accordingly, the conventional industrial machine increases its own weight due to the respective provisions of the housings made by the aluminum die casting product. The increased weight of the machine will lower the transportation of the entire machine, and increases its cost.

SUMMARY OF THE INVENTION

It is therefore, an object of the present invention to overcome the above described drawback, and to provide an improved motor unit having light weight housing and produced at low cost and capable of being rigidly fixed to a fixing portion.

This and other objects of the present invention will be attained by providing a motor unit for controllingly driving a driving component of a machine having a fixing portion; the motor unit including a base, a drive motor and a control portion. The base is made of a metal, and the base has a plate-like portion having one and opposite surfaces and a supporting portion fixed to the fixing portion of the machine. The drive motor is fixed to the one surface of the plate-like portion. The control portion is fixed to the opposite surface of the plate like portion for controlling driving mode of the drive motor.

DETAILED DESCRIPTION OF THE PREFERRED EMBODIMENTS

Figure 1:
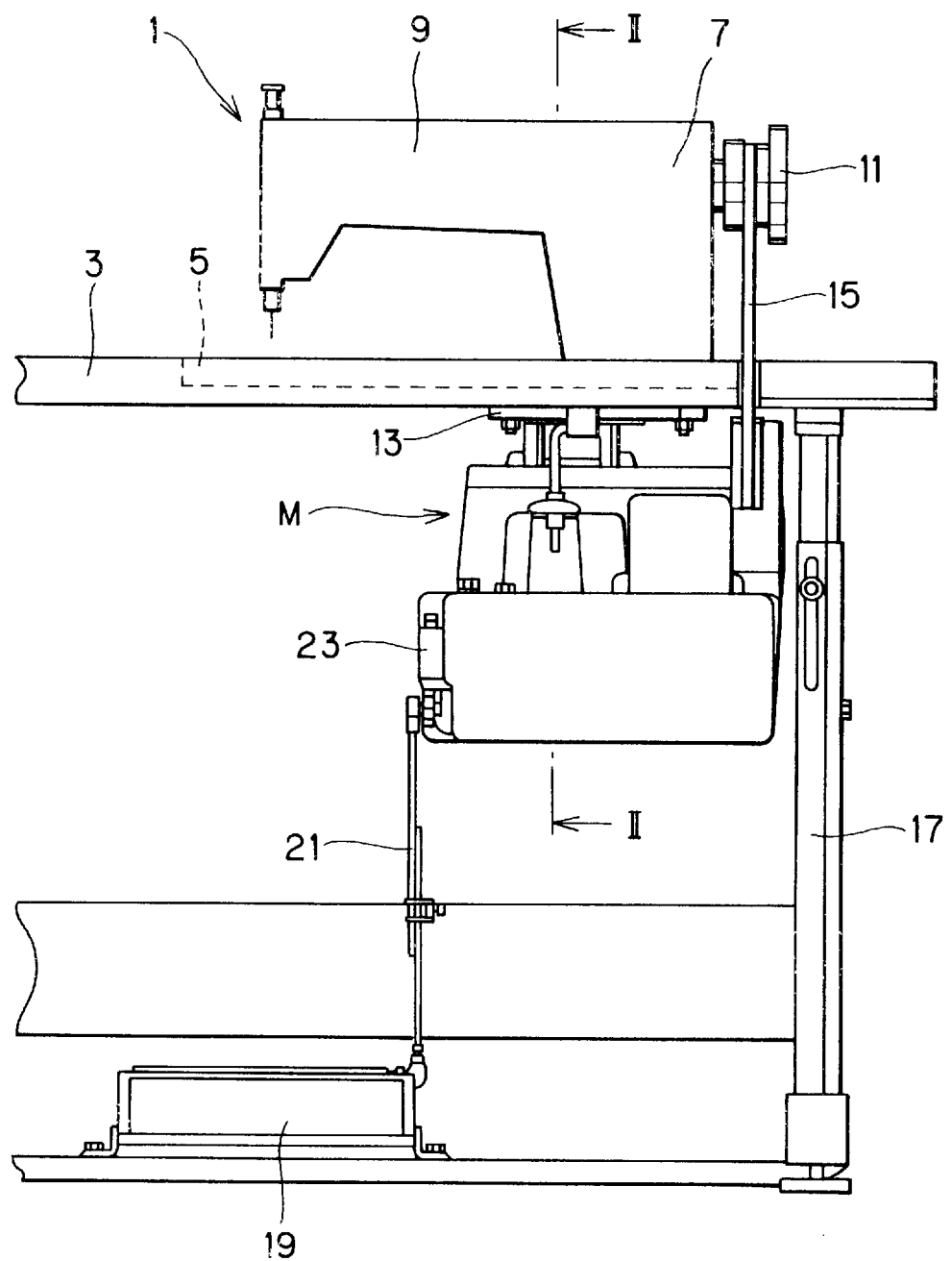
FIG. 1 is a front view showing an industrial sewing machine to which a motor unit according to one embodiment of the present invention is incorporated.

A motor unit according to one embodiment of the present invention will be described with reference to FIGS. 1 through 4. FIG. 1 shows an industrial lock stitch sewing machine incorporating a motor unit M according to the embodiment. The sewing machine 1 includes a work table 3, a bed portion 5 installed on the work table 3, a post portion 7 which upstands from one end portion of the bed portion 5, and an arm portion 9 extending from the post 7 in a direction approximately parallel with the bed portion 5 toward another end portion thereof. A drive shaft (not shown) extends in the arm portion 9 in a direction parallel with the bed portion 5, and a manual operation pulley 11 is provided at one side of the arm portion 9 for rotating the drive shaft about its axis. Such structure is well known in the art. Further, a thread cutting mechanism (not shown) is provided in the arm portion 9.

A fixing stand 13 made by aluminum die-casting product is attached to a lower surface of the work table 3, and a motor unit M is fixedly secured to the fixing stand 13 in such a manner that a motor shaft 30a or 30b (FIG. 3) extends in parallel with the drive shaft of the sewing machine 1. An endless belt 15 is mounted between the motor shaft 30a and the pulley 11, so that the rotation of a drive motor 30 can be transmitted to the drive shaft of the sewing machine 1 through the endless belt 15 and the pulley 11.

A work stand 17 is provided for supporting the work table 3, and a foot pedal 19 adapted for controlling operation of the sewing machine is swingably supported to a lower portion of the work stand 17. At one side of the motor unit M, a pedal sensor 23 is attached, and a connection rod 21 is connected between the foot pedal 19 and the pedal sensor 23. The pedal sensor 23 is adapted to detect angular posture or orientation of the foot pedal 19. For example, if the pedal sensor 23 detects a forward pedaling position of the foot pedal 19, the pedal sensor 23 generates a first signal so that the drive motor 30 is energized at a speed proportional to the frontward pedaling angle, and if the pedal sensor 23 detects a rearward pedaling, the pedal sensor 23 generates a second signal so that the thread cutting mechanism is actuated, and if the pedal sensor 23 detects an intermediate or neutral position of the foot pedal 19, the pedal sensor 23 generates a third signal so that the drive motor 30 is deenergized.

Figure 2:
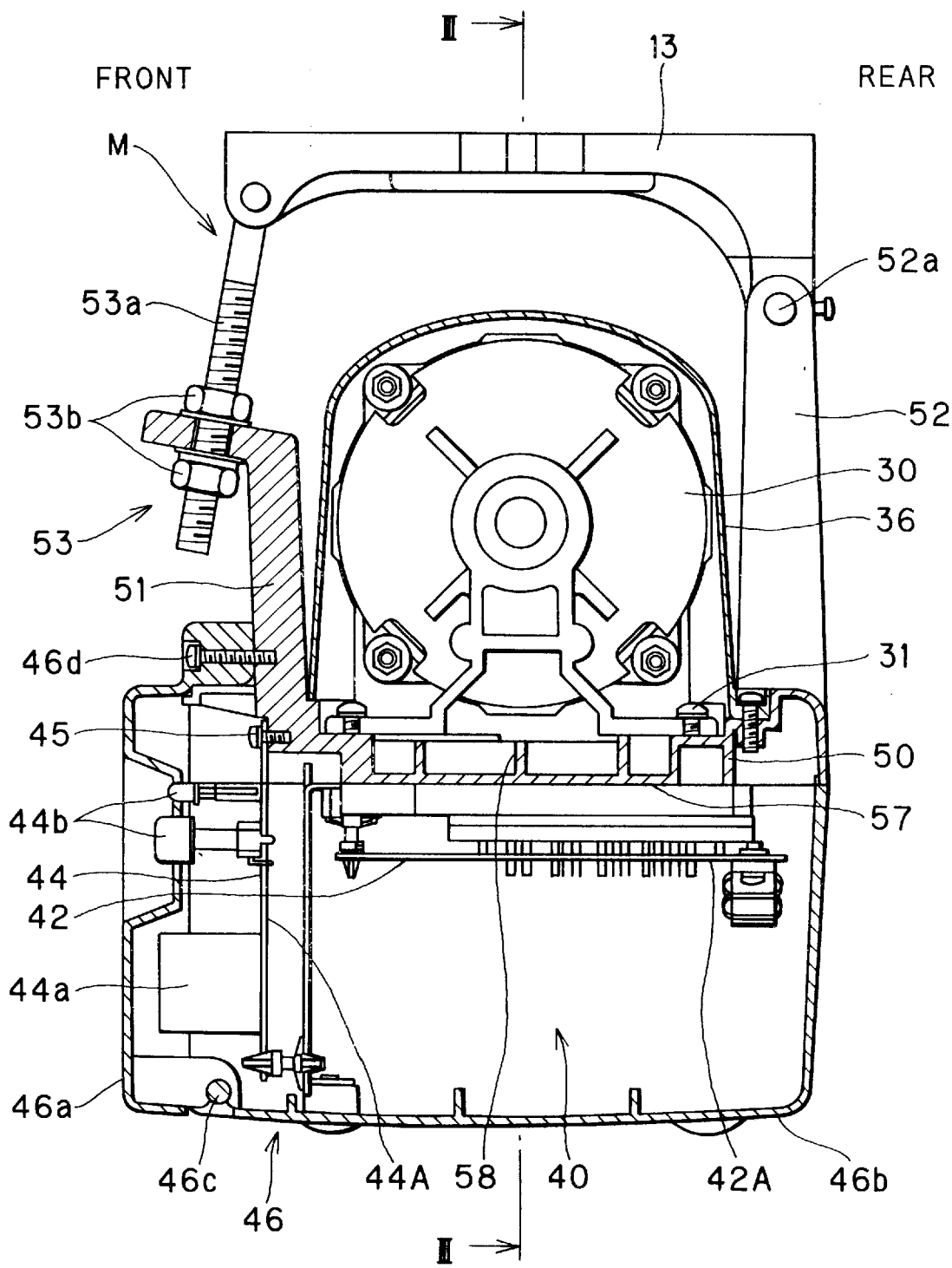
FIG. 2 is a cross-sectional view taken along the line II—II of FIG. 1 for showing the motor unit according to the embodiment.
Figure 3:
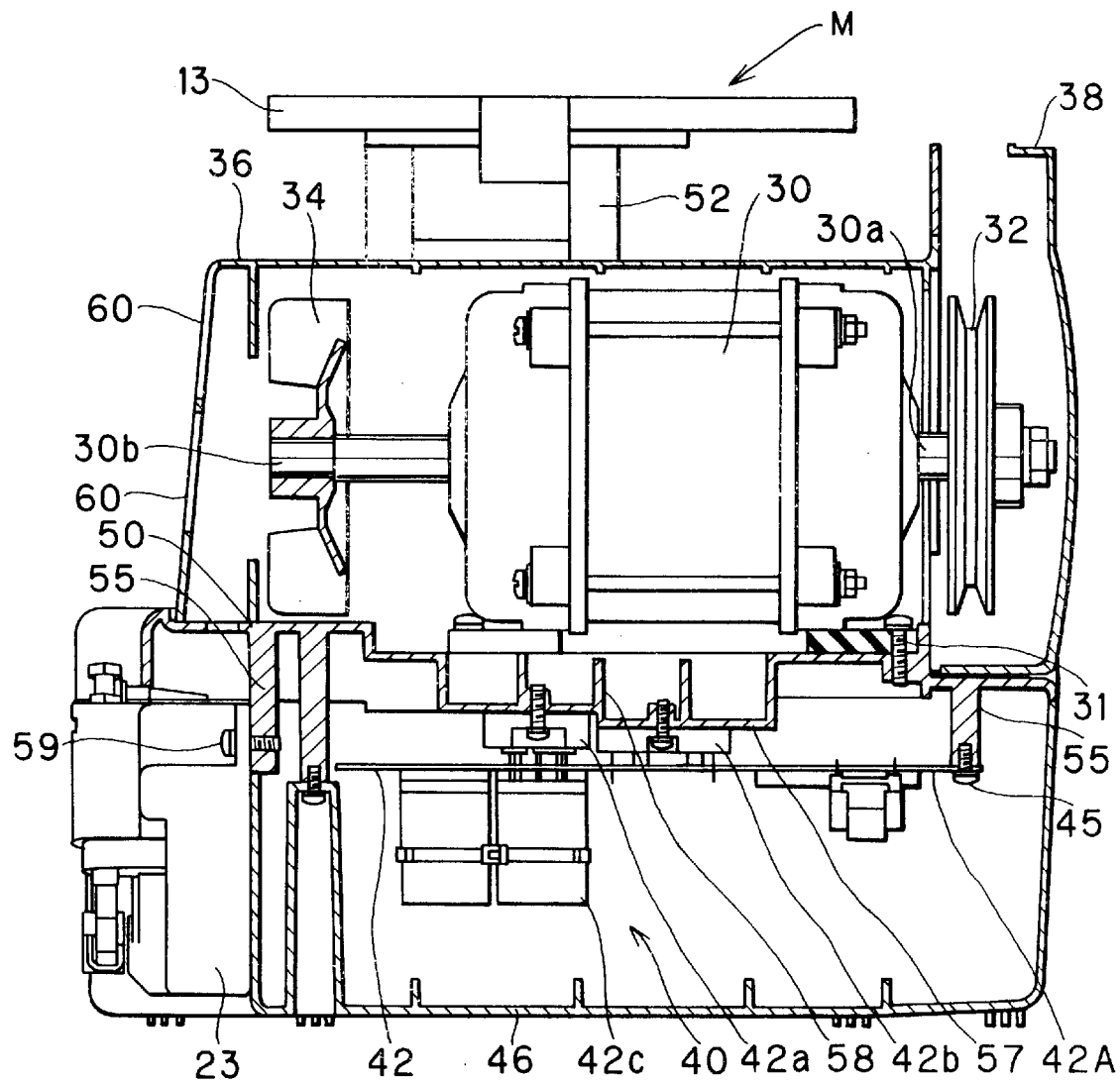
FIG. 3 is a cross-sectional view taken along the line III—III of FIG. 2.

The motor unit M is shown in detail in FIGS. 2 and 3. The motor unit M is mainly constituted by the drive motor 30, a control portion 40, and a base 50. The drive motor 30 is a widely available frameless motor such as an induction motor. The control portion 40 is adapted to receive the detection signal from the foot pedal sensor 23 so as to control the drive motor 30 in response to the detection signal. The base 50 is made from an aluminum die-casting plate like product. The aluminum die-casting product is advantageous over iron based product in light of strength, weight, durability and heat radiation efficiency. The drive motor 30 is fixed to one surface of the base 50, and the control portion 40 is fixed to an opposite surface of the base 50. Thus, the drive motor 30 and the control portion 40 are incorporated into a single unit, i.e., the motor unit M.

As best shown in FIG. 2, the base 50 integrally provides front and rear supporting brackets 51, 52 extending upwardly from the base 50 so as to fix the base 50 to the fixing stand 13. These supporting brackets 51, 52 are integrally molded with the base 50 during the die-casting. The rear supporting bracket 52 has its upper end portion pivotally supported to the fixing stand 13 by a pivot shaft 52a. Therefore, the motor unit M is pivotally movable about an axis of the pivot shaft 52a. On the other hand, the front supporting bracket 51 has an upper portion provided with a position adjusting unit 53. The position adjusting unit 53 has a threaded bolt 53a pivotally supported to the fixing stand 13 and a pair of nuts 53b, 53b threadingly engageable with the threaded bolt 53a. The threaded bolt 53a extends through the upper portion of the front supporting bracket 51, and the nuts 53b, 53b interpose therebetween the upper portion of the front supporting bracket 51. By rotating the nuts 53b, 53b, the nuts move in an axial direction of the threaded bolt 53a to move the upper portion of the front supporting bracket 51 in the same direction, so that the angular position of the base 50 with respect to the pivot shaft 52a is adjustable. By the front and rear supporting brackets 51 and 52, the base 50 is suspended from the fixing stand and orientation of the base 50 can be set parallel with the work table 3 of the sewing machine by adjusting the position adjusting unit 53.

The drive motor 30 is fixed to the upper surface of the base 50 by four screws 31. The motor shaft has the rightwardly protruded part 30a to which a pulley 32 is coupled. The above described endless belt 15 is mounted on the pulley 32. The motor shaft has a leftwardly protruded part 30b to which a cooling fan 34 is coupled for cooling the drive motor 30.

A motor cover 36 and a belt cover 38 are mounted upon the base 50. The motor cover 36 is adapted to cover the entire contour of the drive motor 30 and the cooling fan 34 except the pulley 32 in order to prevent an operator from touching the drive motor 30 and prevent a sewing needle from being dropped into an ambient area of the drive motor 30. The belt cover 38 is adapted to cover the pulley 32 yet allowing the endless belt 15 to pass therethrough in order to prevent a work fabric from being enrolled or trapped between the endless belt 15 and the pulley 32.

The motor cover 36 is made of a resin material which has a light weight and is inexpensive. Further, heat conductivity of the resin material is lower than that of a metal. Therefore, even if the internal temperature of the drive motor 30 is increased, the motor cover 36 is not so heated to protect an operator against a burn.

The control portion 40 attached to the lower surface of the base 50 includes a power source substrate 42 and a control board 44. The power source substrate 42 extends in parallel with and is fixed to the lower surface of the base 50. More specifically, ribs 55 extends downwardly from the lower surface of the base 50, and the substrate 42 is fixed to the ribs 55, 55 by screws 45. The substrate 42 includes a print circuit board 42A, a diode bridge 42a, a power element 42b and an electronic component 42c those being assembled to the print circuit board 42A. The diode bridge 42a is adapted for converting alternate current into direct current. The power element 42b is adapted for converting the direct current voltage into a predetermined alternate current drive signal for driving the drive motor 30. The electronic component 42c constitutes a power source circuit for supplying electrical power to the control board 44.

The control board 44 is positioned at a forward side and fixed to the base 50 by screws 45 and extends downwardly from the lower surface of the base 50. The control board 44 includes a print circuit board 44A, one-chip microcomputer 44a for controlling the drive motor 30, and a display element 44b such as LED for displaying operation mode of the sewing machine 1. The microcomputer 44a and the display element 44b are assembled to the print circuit board 44A.

As shown in FIG. 3, the diode bridge 42a and the power element 42b, those being heat generating elements, are directly mounted on the base 50. The base 50 serves as a radiator or a heat releasing member. To this effect, the lower surface of the base 50 is not a simple flat surface but a discontinuous or stepped surface to provide a protruding part 57, and the ribs 55 of the base 50 have a suitable protruding length. With this structure, the diode bridge 42a and the power element 42b can be directly mounted on the lower surface of the base 50, yet these being assembled onto the print circuit board 42A. This structure is advantageous in that entire part numbers can be reduced for assembling the motor unit M to reduce production cost. For example, if the lower surface of the base 50 is a mere flat plane, it is necessary to provide additional spacer member or attachment piece so as to mount the diode bridge 42a and the power element 42b on the base 50 for radiation yet these being assembled into the print circuit board 42A.

Figure 4:
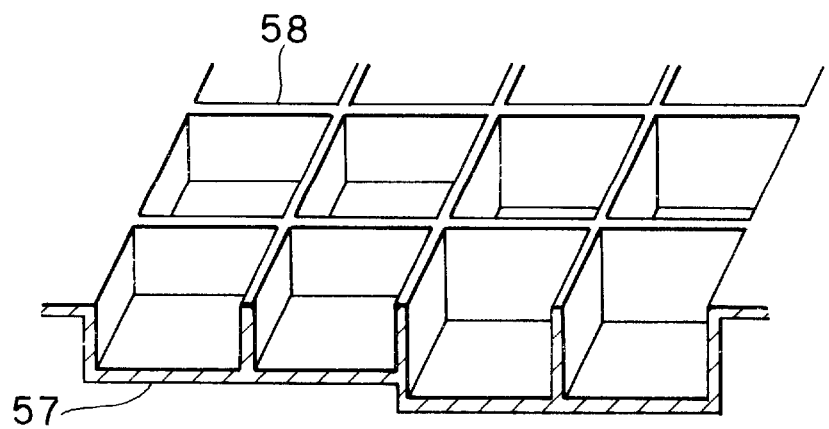
FIG. 4 is a partial perspective view showing a fin provided at a base of the motor unit according to the embodiment of this invention.

In order to enhance heat releasing efficiency, the base 50 is integrally provided with grid shaped cooling fins 58 as shown in FIG. 4 in the protruding part. The grid shaped cooling fins 58 will provide an upper open ends as shown. Because the heat generating elements are directly mounted on the base 50, the heat can be smoothly released from the grid shaped fins 58. Further, the grid shaped fins enhance mechanical strength of the base 50, and can lower entire weight of the base 50. The fins increases entire surface area of the base 50. Thus, by mounting the heat generating elements on the base having the fins 58, the base 50 itself can serve as a radiator. Thus, it is not necessary to additionally provide a radiation member such as a heat-sink member, thereby reducing numbers of components.

A protection cover 46 made of resin is provided over the lower surface of the base 50 for covering the control portion 40 in order to prevent the sewing needle from being entered into the control portion 40. The protection cover 46 is provided by complementary front cover 46a and a rear cover 46b. The front cover 46a is disposed in front of the control board 44 for covering the front surface of the print circuit board 44A, the one-chip microcomputer 44a and the display element 44b except its displaying surface. The rear cover 46b is disposed behind the control board 44 for covering power source substrate 42. The front cover 46a is provided pivotable about a pivot shaft 46c, and is fixed to the front supporting bracket 51 by a screw 46d. By unfastening the screw 46d, the front cover 46a can be opened, so that maintenance can be made on the control portion 40 without removing the entire motor unit M from the sewing machine 1.

The motor cover 36 and the protection cover 46 are not adapted for positively fixing the drive motor 30 and the control portion 40 to the sewing machine 1, but are adapted merely for enhancing safety for the operator and protecting the motor and the control portion against external condition. Accordingly, these covers can be made by synthetic resin. As shown in FIG. 3, the pedal sensor 23 is disposed outside the protection cover 46, and is fixed to a rib 55 extending from the lower surface of the base 50 by screws 59. Further, the motor cover 36 is formed with a plurality of slits 60 so as to introduce external air to the cooling fan 34 therethrough.

As described above, in the illustrated embodiment, the drive motor 30 and the control portion 40 are provided in a single unit. Therefore, it is unnecessary to respectively secure the drive motor 30 and the control portion 40 to the sewing machine 1, thereby improving assembleablity thereof. Further, it is unnecessary to independently house the drive motor 30 and the control portion 40 in respective housings, but these can be fixed to a common aluminum die casting base 50. Consequently, resultant weight can be reduced, and production cost can be lowered.

While the invention has been described in detail and with reference to the specific embodiment thereof, it would be apparent to those skilled in the art that various changes and modifications may be made therein without departing from the spirit and scope of the invention. For example, the motor unit M is described as being used as a driving device for the industrial sewing machine. However, the motor unit M can be incorporated into other machine as far as the machine has a structure capable of attaching the supporting brackets 52, 53. Furthermore, at least one of the motor cover 36 and the protection cover 46 can be dispensed with, or both can be dispensed with.

What is claimed is:

1. A motor unit for controllingly driving a driving component of a machine having a fixing portion; the motor unit comprising:
    a base made of a metal, the base having a plate-like portion having one and opposite surfaces and a supporting portion fixed to the fixing portion of the machine;
    a drive motor fixed to the one surface of the plate-like portion; and
    a control portion fixed to the opposite surface of the plate-like portion for controlling driving mode of the drive motor, the control portion comprising a plurality of electronic components,
    wherein the base integrally provides front and rear supporting brackets serving as the supporting portion, the rear supporting bracket having an upper portion pivotably connected to the fixing portion, and the front supporting bracket having an upper portion provided with an adjusting mechanism that changes a distance between the fixing portion and the upper portion of the front supporting bracket.

2. The motor unit as claimed in claim 1, further comprising a motor cover mounted on the surface of the plate-like portion for covering the drive motor.

3. The motor unit as claimed in claim 2, wherein the motor cover is made of a synthetic resin.

4. The motor unit as claimed in claim 3, further comprising a protection cover mounted on the opposite surface of the plate-like portion for covering the control portion.

5. The motor unit as claimed in claim 4, wherein the protection cover is formed of a synthetic resin.

6. The motor unit as claimed in claim 5, wherein the protection cover comprises a separable portion for facilitating access to the control portion.

7. The motor unit as claimed in claim 6, wherein the opposite surface of the base has discontinuous planes, at least one plane corresponding to configuration of at least one electronic component of the control portion, at least one electronic component being directly mounted on the at least one plane.

8. The motor unit as claimed in claim 7, wherein the base comprises a protruding part in which grid shaped fins are integrally provided.

9. The motor unit as claimed in claim 8, wherein the at least one electronic components comprises a heat generating element, and wherein the heat generating element is directly mounted on the base at a position corresponding to the fins.

10. The motor unit as claimed in claim 9, wherein the base is made of an aluminum die-casting product.

11. The motor unit as claimed in claim 1, wherein the opposite surface of the base has discontinuous planes, at least one plane corresponding to configuration of at least one electronic component of the control portion, at least one electronic component being directly mounted on the at least one plane.

12. The motor unit as claimed in claim 11, wherein the base comprises a protruding part in which grid shaped fins are integrally provided.

13. The motor unit as claimed in claim 12, wherein the at least one electronic components comprises a heat generating element, and wherein the heat generating element is directly mounted on the base at a position corresponding to the fins.

14. The motor unit as claimed in claim 13, wherein the base is made of an aluminum die-casting product.

15. The motor unit as claimed in claim 1, further comprising a protection cover mounted on the opposite surface of the plate-like portion for covering the control portion.

16. The motor unit as claimed in claim 15, wherein the protection cover is formed of a synthetic resin.

17. The motor unit as claimed in claim 16, wherein the protection cover comprises a separable portion for facilitating access to the control portion.

18. The motor unit as claimed in claim 1, wherein the machine is a sewing machine comprising a bed, a post upstanding from the bed, an arm portion extending from the post, a drive shaft extending in the arm portion, a work table installing the bed, and a fixing stand fixedly secured to the work table, the fixing stand serving as the fixing portion, the drive motor being drivingly connected to the drive shaft.

19. The motor unit as claimed in claim 1, wherein:
    the drive motor has a motor shaft extending in parallel with the plate-like portion;
    the control portion is out of alignment with the motor shaft; and
    the motor unit further comprises a motor cover mounted on the surface of the plate-like portion for covering the drive motor.

20. The motor unit as claimed in claim 1, wherein the drive motor has a motor shaft extending in parallel with the plate-like portion.

21. The motor unit as claimed in claim 20, wherein the control portion is out of alignment with the motor shaft.

22. The motor unit as claimed in claim 21, further comprising a motor cover mounted on the surface of the plate-like portion that covers the drive motor.

23. The motor unit as claimed in claim 20, further comprising a motor cover mounted on the surface of the plate-like portion that covers the drive motor.

24. A motor unit for controllingly driving a driving component of a machine having a fixing portion; the motor unit comprising:
    a base made of a metal, the base having a plate-like portion having one and opposite surfaces and a supporting portion fixed to the fixing portion of the machine;
    a drive motor fixed to the one surface of the plate-like portion; and
    a control portion fixed to the opposite surface of the plate like portion for controlling driving mode of the drive motor, the control portion comprising a plurality of electronic components,
    wherein the machine is a sewing machine comprising a bed, a post upstanding from the bed, an arm portion extending from the post, a drive shaft extending in the arm portion, a work table installing the bed, and a fixing stand fixedly secured to the work table, the fixing stand serving as the fixing portion, the drive motor being drivingly connected to the drive shaft.

* * * * *